United States Patent
Ren et al.

(10) Patent No.: US 10,978,695 B2
(45) Date of Patent: Apr. 13, 2021

(54) ANODE ACTIVE MATERIAL AND ANODE FOR LITHIUM-ION BATTERY, METHOD FOR PREPARING THE ANODE ACTIVE MATERIAL, AND LITHIUM-ION BATTERY

(71) Applicant: GP Batteries International Limited, Hongkong (HK)

(72) Inventors: Xian-Wen Ren, Hongkong (HK); Yu-Sum Chow, Hongkong (HK); Wei-Gong Zheng, Hongkong (HK); Jia-Miao Liu, Hongkong (HK); Wei-Chen Hu, Hongkong (HK); Kwok-Fung Kan, Hongkong (HK)

(73) Assignee: GP Batteries International Limited, Hongkong (HK)

( * ) Notice: Subject to any disclaimer, the term of this patent is extended or adjusted under 35 U.S.C. 154(b) by 138 days.

(21) Appl. No.: 16/225,794

(22) Filed: Dec. 19, 2018

(65) Prior Publication Data
US 2019/0237753 A1    Aug. 1, 2019

(30) Foreign Application Priority Data
Jan. 31, 2018    (CN) .......................... 201810098842.3

(51) Int. Cl.
| | | |
|---|---|---|
| *H01M 4/36* | (2006.01) |
| *H01M 4/134* | (2010.01) |
| *H01M 4/133* | (2010.01) |
| *H01M 4/1395* | (2010.01) |
| *H01M 4/1393* | (2010.01) |
| *H01M 4/62* | (2006.01) |
| *H01M 4/04* | (2006.01) |
| *H01M 10/0525* | (2010.01) |
| *H01M 4/587* | (2010.01) |
| *H01M 4/131* | (2010.01) |
| *H01M 4/1391* | (2010.01) |
| *H01M 4/48* | (2010.01) |

(Continued)

(52) U.S. Cl.
CPC ........ *H01M 4/364* (2013.01); *H01M 4/0471* (2013.01); *H01M 4/131* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/366* (2013.01); *H01M 4/48* (2013.01); *H01M 4/587* (2013.01); *H01M 4/621* (2013.01); *H01M 4/625* (2013.01); *H01M 10/0525* (2013.01); *H01M 4/386* (2013.01); *H01M 4/583* (2013.01); *H01M 2004/027* (2013.01)

(58) Field of Classification Search
None
See application file for complete search history.

(56) References Cited

FOREIGN PATENT DOCUMENTS

| | | | |
|---|---|---|---|
| CN | 101207198 A | * | 6/2008 |
| CN | 101207198 A | | 6/2008 |

(Continued)

*Primary Examiner* — Daniel S Gatewood
(74) *Attorney, Agent, or Firm* — ScienBiziP, P.C.

(57) ABSTRACT

An anode active material for a lithium-ion battery with greatly reduced recharging time includes SiO particles, graphite particles, and a carbon coating layer. The graphite particles and SiO particles are processed to form spherical SiO/graphite composite particles. A layer of carbon coating is applied to the surface of the SiO/graphite composite particle and the resulting anode active material resembles a pomegranate structure.

4 Claims, 13 Drawing Sheets

(51) Int. Cl.
*H01M 4/583* (2010.01)
*H01M 4/02* (2006.01)
*H01M 4/38* (2006.01)

(56) References Cited

FOREIGN PATENT DOCUMENTS

| CN | 106328887 A | * | 1/2017 |
| CN | 106328887 A | | 1/2017 |
| CN | 107230781 A | * | 10/2017 |
| CN | 107230781 A | | 10/2017 |

* cited by examiner

ANODE ACTIVE MATERIAL AND ANODE FOR LITHIUM-ION BATTERY, METHOD FOR PREPARING THE ANODE ACTIVE MATERIAL, AND LITHIUM-ION BATTERY

FIELD

The disclosure relates to batteries, and more particularly to lithium-ion batteries.

BACKGROUND

Rechargeable lithium-ion batteries are widely used in portable devices and electric vehicles. Compared with lead-acid batteries and nickel-metal-hydride batteries, lithium-ion batteries exhibit high energy density, no memory effect, and a slow rate of self-discharge. Thus lithium-ion batteries are widely used for energy storage.

Fast-charging technology of batteries is also desirable, which enables the batteries back for reuse in few minutes after they run out of power. The charging rate can be optimized by altering active materials, electrodes, and cells. The most usual method is to reduce the size of active materials to shorten the diffusion path of ions and electrons and to increase the surface areas for charge transfer. Current lithium-ion batteries generally use graphite as the anode active material. However, the employment of small graphite particles to improve the charging rate is often at the cost of lowering the capacity and the energy density. On the other hand, silicon (Si) is a promising candidate of anode active material due to its high theoretical capacity of 4200 mAh/g, which is more than ten times that of graphite. Even though Si and its oxide silicon monoxide (SiO) are effective to improve the energy density of lithium-ion batteries, the poor conductivity of Si and SiO limited their applications as active materials to construct faster-charging lithium-ion batteries.

Thus, there is still room for improvement within the art.

BRIEF DESCRIPTION OF THE DRAWINGS

Implementations of the disclosure will now be described, by way of example only, with reference to the attached figures.

FIGS. 2A and 2B show SEM image and the corresponding EDS images of an SiO/graphite composite particle, while EDS images in FIGS. 2C and 2D show the distribution of carbon and silicon in the anode active material, respectively.

FIGS. 9A and 9B show SEM image and the corresponding EDS image of a SiO/graphite/SWCNT composite particle, while EDS images in FIGS. 9C and 9D show the distribution of carbon and silicon in the anode material, respectively.

DETAILED DESCRIPTION

Figure 1A:
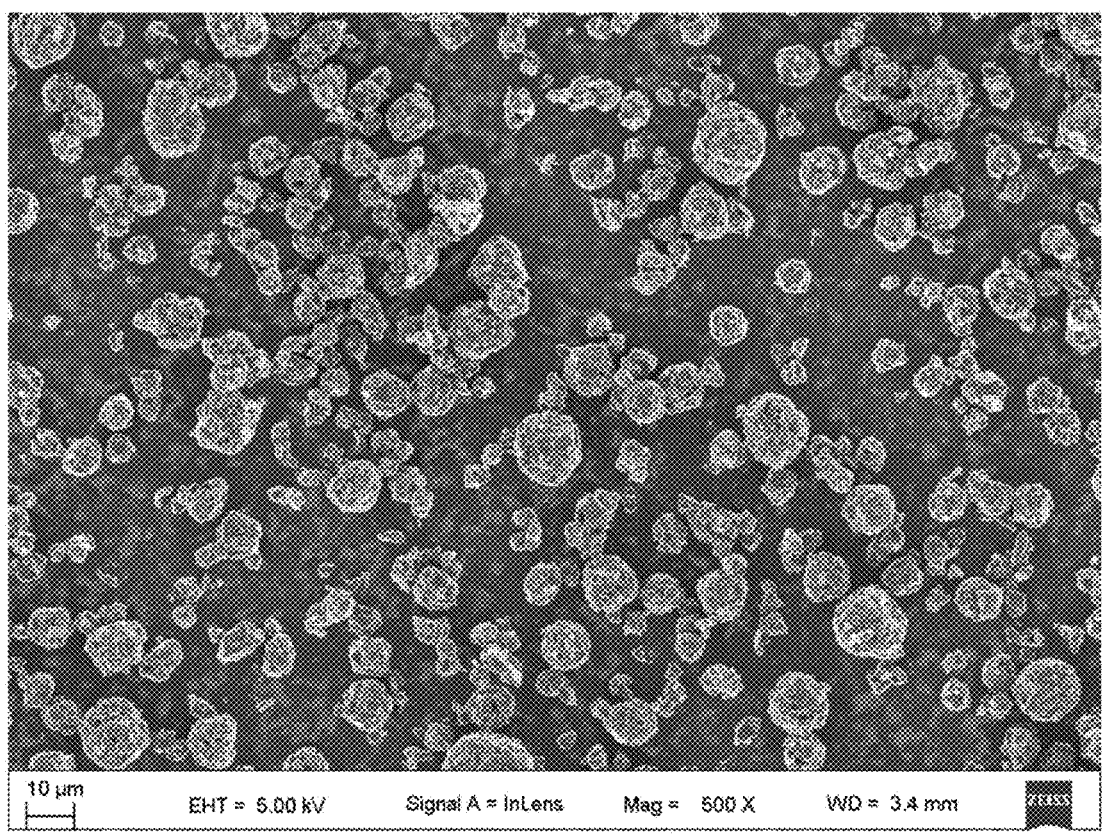
FIGS. 1A to 1C are SEM (scanning electron micrography) images of different magnifications of the SiO/graphite composite particles as described in Example 1. The magnifications in FIGS. 1A to 1C are subsequently 500×, 5000×, and 30000×.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the disclosure.

The disclosure provides an anode active material used for a lithium-ion battery. The anode active material includes SiO particles, graphite particles, and a carbon coating layer. SiO particles and graphite particles are mixed together to form spherical SiO/graphite composite particles. The carbon coating layer covers on the surface of SiO/graphite composite particles, forming a structure of pomegranate.

The graphite particles act as the seeds in the pomegranate structure, while SiO particles fill the space among the graphite particles. The carbon coating layer is formed on the surface of SiO/graphite composite particles. The SiO particles have particle size in the range of 50 nm to 5 nm, while the particle size of the graphite particles is in the range of 1 to 10 μm. The thickness of the carbon coating layer is about 20 to 200 nm. The particle size of the final composite particles is in the range of 10 to 50 μm. SiO and graphite particles have an average pore size in the range of 4.6 to 6.2 nm, while the pore size of the SiO/graphite composite material is in the range of 200 to 500 nm.

Nano-scale and micro-scale pores exist in the SiO/graphite composite particles. These pores provide voids that allow the SiO particles to swell during charging, as well as a very large total surface area on the anode active materials which increases the rate of charge transfer of ions and electrons.

In an embodiment, the respective mass percentages of the SiO particles, the graphite particles, and the carbon coating layer are 1~19%:80~98%:1~10%.

In the embodiment, the used SiO particle has a core-shell structure, which includes a SiO particle core and a carbon coating shell. The carbon coating shell can be formed by grafting polymers on the surface of bare SiO particle core and then calcinating the polymers. In an embodiment, polymers are grafted to the SiO particle core by covalent bonding. The polymers may include at least one from polystyrene, poly N-isopropyl acrylamide, polyacrylic acid, and polyvinyl pyrrole.

In an embodiment, the carbon coating layer on the surface of the SiO/graphite composite particle is prepared by calcinating a binder and surfactant.

The carbon coating of the SiO particles and the SiO/graphite composite particles increases the conductivity of the SiO particles and protects the SiO particles against corrosion by hydrofluoric acid (HF) and other impurities in the electrolyte. The covalent bonding increases the bonding strength between the SiO particle core and the carbon coating layer, such that the carbon coating does not easy lose contact with the SiO particle core when the SiO expands and shrinks during the cycles of charging and discharging. The traditional chemical carbon coating method involves the use of highly reactive reagents such as alkyl lithium, alkoxides, and others. In addition, the traditional chemical carbon coating method is not suitable for an organic carbon layer with a chain length more than 12 carbon atoms. In comparison, the carbon coating of the disclosure can be polymers of arbitrary chain length. Furthermore, our method is environmentally friendly because of the used solvents of low toxicity solvents.

The thickness of the carbon coating layer on the surface of the SiO/graphite composite particles depends on the relative amount of the binder and the surfactant. The higher the relative amount of the binder and the surfactant, the thicker the carbon coating layer. Generally, the thick carbon coating layer protects SiO well. However, thick carbon coating layer can significantly reduce the specific capacity of the composite particles.

In an embodiment, carbon nanotubes were added to prepare the anode active material. The carbon nanotubes form a network to surround SiO particles and graphite particles. The carbon nanotubes may be single-walled carbon nanotubes and/or multi-walled carbon nanotubes. The carbon nanotube network effectively enhances the electrical conductivity of the anode active material, increasing the fast charging capability of the battery. The network also helps maintain the structure of the anode active material when SiO particles expand during the lithiation process (charging).

In an embodiment, a mass percentage of the carbon nanotubes in all solid of the anode can be 0.1% to 0.5%. In one embodiment, the mass percentage is 0.1% to 0.2%.

The disclosure further provides a method of preparing the anode active material for the lithium-ion battery. The method may include any or all of the following actions, and the actions may be applied in more than one sequence.

At action 1, SiO particles, graphite particles, binder, and surfactant are mixed and dissolved in a solvent to form a suspension.

At action 2, the suspension is spray dried and calcined, to prepare the anode active material.

In an embodiment, the binder is a hydrophilic organic compound, and the surfactant is one or more organic compounds of long chains. In an embodiment, the binder has a mass percentage of about 1% to 20% of all solids (including the SiO particles, the graphite particles, the binder, and the surfactant). The surfactant has a mass percentage of about 1% to 5% of all solids.

In an embodiment, the binder may include at least one of monosaccharide, oligosaccharide, and polysaccharide. The surfactant may be at least one of sodium lauryl sulfate, polyethylene glycol, polyethylene glycol-polypropylene oxide block copolymer, and sodium dodecyl benzene sulfonate.

In one embodiment, the binder may be at least one of sucrose, fructose, glucose, glycogen, and cellulose.

In an embodiment, the SiO particle is a carbon-coated SiO particle of a core-shell structure, which includes a SiO particle core and a carbon coating shell. The carbon coating shell can be formed by grafting polymers on the surface of SiO particle core, followed by the calcination of the polymers. The polymers may be at least one of polystyrene, poly N-isopropylacrylamide, polyacrylic acid, and polyvinyl pyrrole. In an embodiment for comparisons, the SiO particle is a bare SiO particle without any coating on the surface.

The polymer grafting is initiated by modifying the surface of SiO particle by coupling agent, and then initiating polymerization from the surface of SiO particle.

For example, an organic silane, such as 3-trimethoxysilylpropyl methacrylate (MPS), is used to modify the surface of SiO particles. The methoxy groups of MPS react with —OH groups on the surface of SiO particles, resulting in MPS bonded to the surface of SiO particles. This reaction is conducted at room temperature in alcohols, such as ethanol, with a slight excess of stoichiometric amount of MPS compared to SiO. The concentration of MPS and SiO both ranges from 0.1% to 10%.

The concentration of SiO is further diluted to 0.1~1% after adding the diluted solution (~0.005 wt %, weight percentage) of the initiators, such as an azobisisobutyronitrile (AIBN). NIPAAM monomers are subsequently added into the reactants. The final reactants are mildly acidic (pH=3~4.5) or mildly alkaline (pH=8~10). 5 wt %~20 wt % of water may be added in order to accelerate the grafting reaction.

Before the grafting reaction, the reactants were dispersed by ultrasound for 30 minutes. The reactants can further be stirred mechanically during the reaction to prevent SiO particles from being aggregated.

The grafting reaction is required to proceed at a temperature that is below the boiling point of the solvent, typically at a temperature of 70 to 80° C. The maximum time duration for the grafting reaction is about 6 to 8 hours. In one embodiment, the time duration is 3 to 4 hours. During the grafting reaction, the reactants can be dispersed by ultrasound for 2 to 3 minutes. Polymers, such as polyvinylpyrrolidone (PVP), carboxymethyl cellulose (CMC), or polyethylene glycol (PEG), can be added to the reactants to ensure a stable dispersion during the grafting reaction, so that SiO particle is grafted without aggregation. The solution is centrifuged and the precipitate is collected, and the precipitate is then dried in vacuum to obtain SiO particles grafted with PNIPAAM. The thickness of the polymers about 5 to 20 nm.

The bare SiO particle can be prepared by heat treating the mixture of Si and $SiO_2$ at 800° C. to 1500° C., reducing $SiCl_4$, or sintering hydrogen silsesquioxane (HSQ).

In an embodiment, a polymer is added to the suspension to stabilize the suspension. The polymer includes polyvinylpyrrolidone (PVP).

The solvent includes water. The mass percentage of water ranges from 80% to 90% of the total mass of the suspension.

In an embodiment, carbon nanotubes are further added into the suspension.

After calcination, the binder and the surfactant become amorphous carbon, forming a carbon coating layer on the surface of the SiO/graphite composite particles.

The size and the porosity of SiO/graphite composite particles depend on the conditions during spray drying, such as the concentration and viscosity of the suspension, the flow rate of suspension, and the temperature and velocity of the gas. A specific surface area of the SiO/graphite composite particles is 1.0 m$^2$/g to 3.0 m$^2$/g.

The calcination temperature is higher than a carbonization temperature of the binder and the surfactant, but lower than a temperature for a disproportionation reaction in which SiO is decomposed to Si and SiO$_2$. In one embodiment, the calcination temperature is from 800° C. to 850° C. In one embodiment, to avoid oxidation, the calcination can be carried out in inert atmospheres, such as nitrogen or argon. The calcination time is not less than two hours. In one embodiment, the calcination lasts for 2 hours to 4 hours.

The disclosure further provides a lithium-ion battery, including slurry preparation and electrode coating with the slurry. The slurry preparation includes the mixing of the anode active materials, battery binder, and conductive agent. The disclosure further provides an anode for the lithium-ion battery, the anode includes the anode active materials.

The mass percentages of the anode active material, the battery binder, and the conductive agent are 90%~98%: 1~5%: 1~5%, respectively.

In an embodiment, the battery binder includes a hydrophilic binder and a hydrophobic binder. The hydrophilic binder may be the combination of carboxymethyl cellulose (CMC) and styrene-butadiene rubber (SBR) emulsion, or the combination of CMC and modified styrene-butadiene rubber emulsion. The hydrophilic binders relieve the stress caused by the volume change of the anode during charging and discharging process.

In an embodiment, the conductive agent may include at least one of vapor grown carbon fiber (VGCF), carbon black, single-walled carbon nanotube (SWCNT), or other types of carbon-based conductive agents.

Methods of electrode coating and of battery assembly are known in the art.

Example 1

100 g bare SiO particles (with an average diameter of about 1 μm), 100 g sugar, 1800 g graphite particles (with an average diameter of about 5 μm), and 3 g sodium dodecyl benzene sulfonate (SDBS) were added to 7 kg water to obtain a suspension, and the suspension was mechanically stirred. The suspension was spray dried at a container temperature of 155~170° C., and calcinated in argon atmosphere at 800~850° C. for 2~4 hours, to obtain the SiO/graphite composite particles. The SiO/graphite composite particles has an average diameter of about 15 μm. The specific surface area of the SiO/graphite composite particles is about 2.9 m$^2$/g as measured by BET.

Figure 1B:
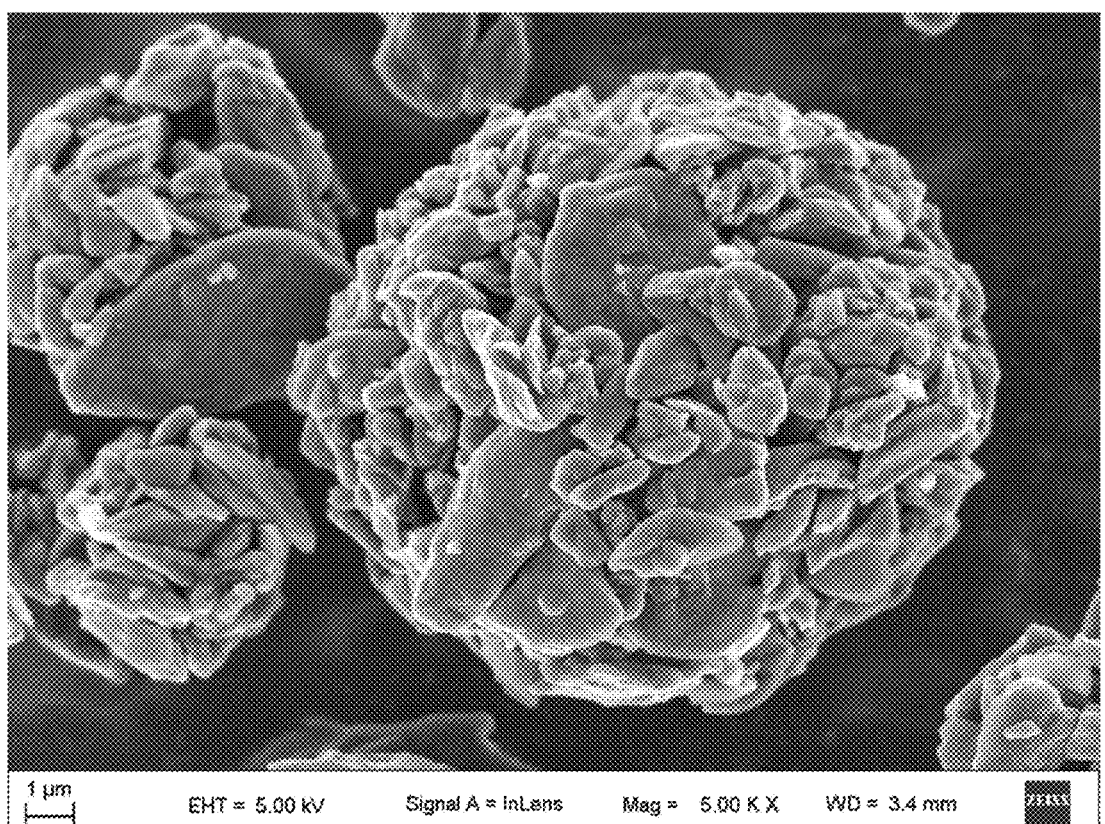
Figure 1C:
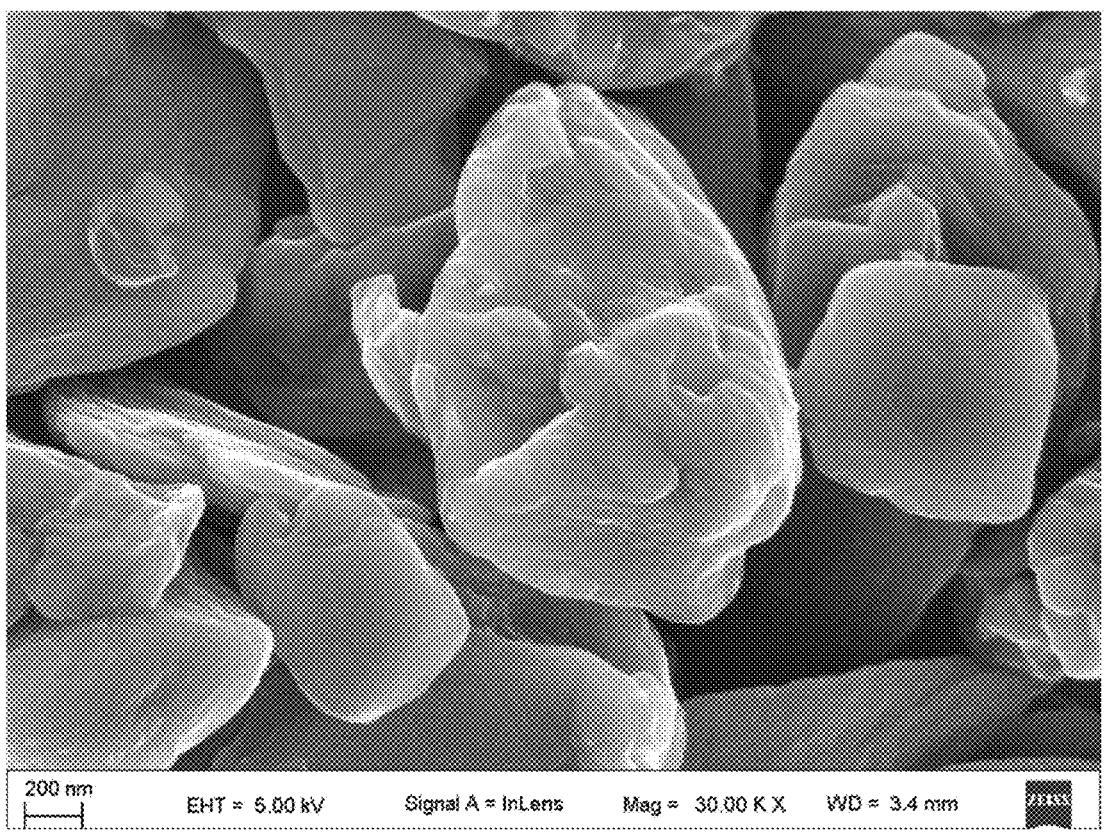
Figure 2A:
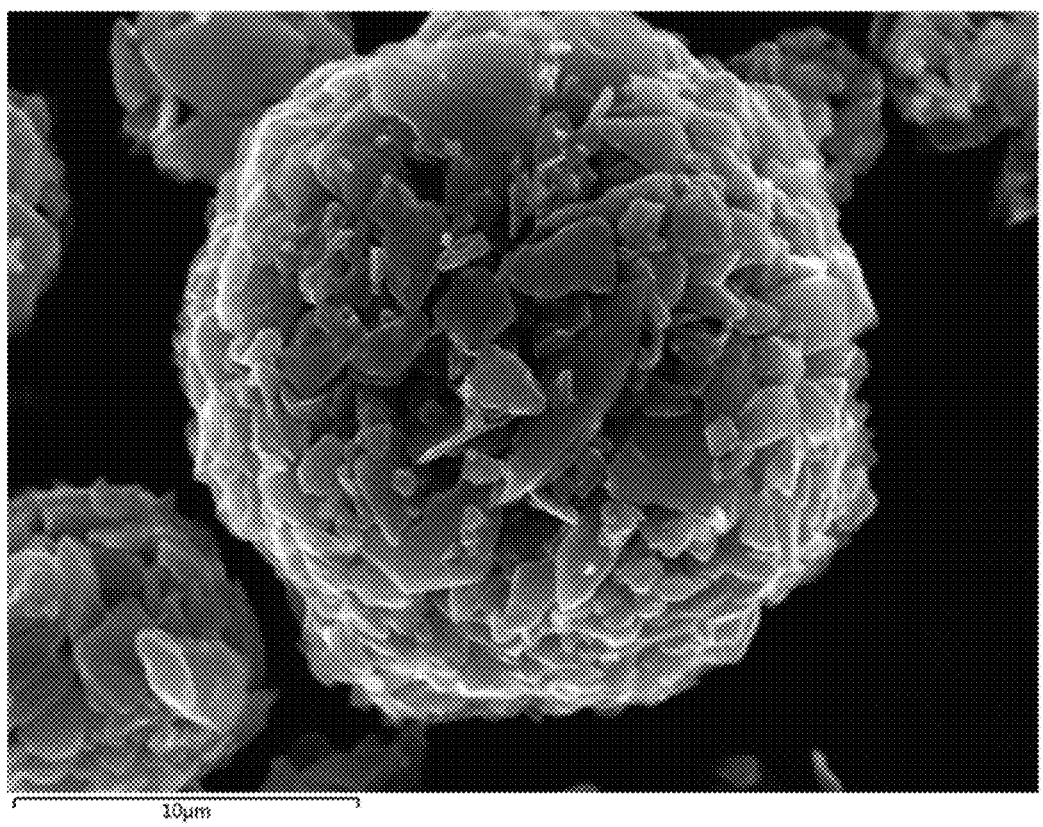
FIGS. 2A to 2D are SEM and EDS (energy dispersive spectrometer) images of the SiO/graphite composite particle as described in Example 1.
Figure 2B:
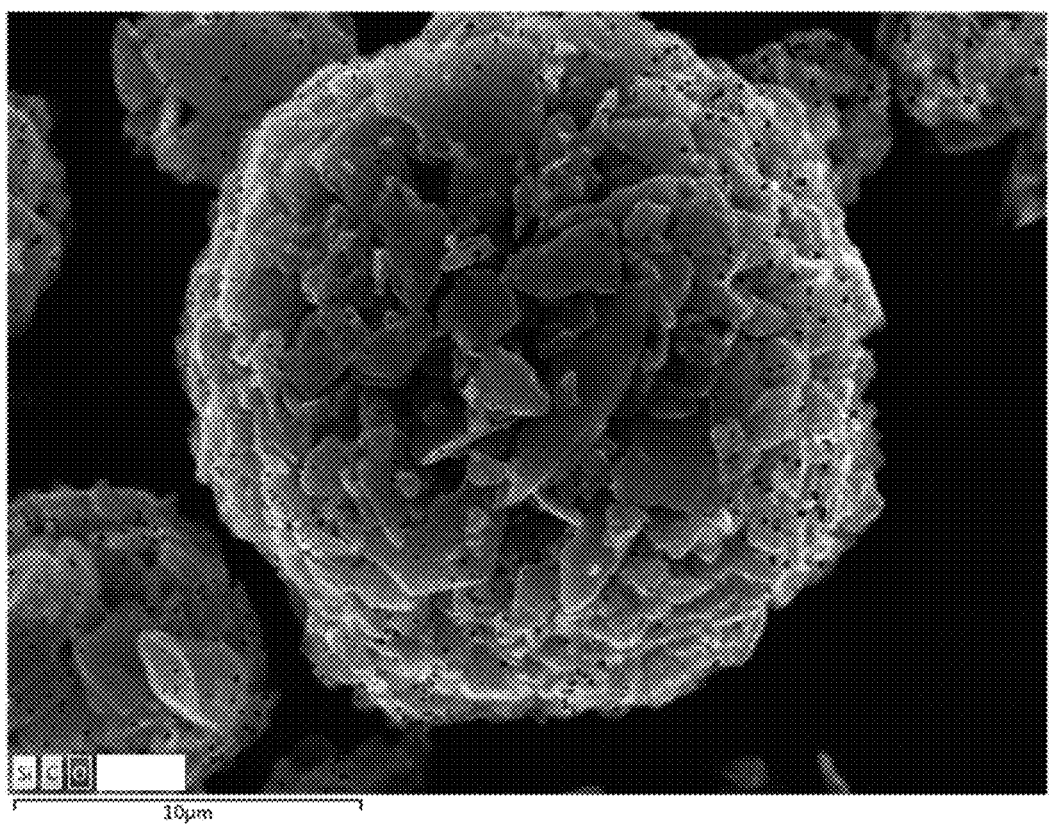
Figure 2C:
Figure 2D:
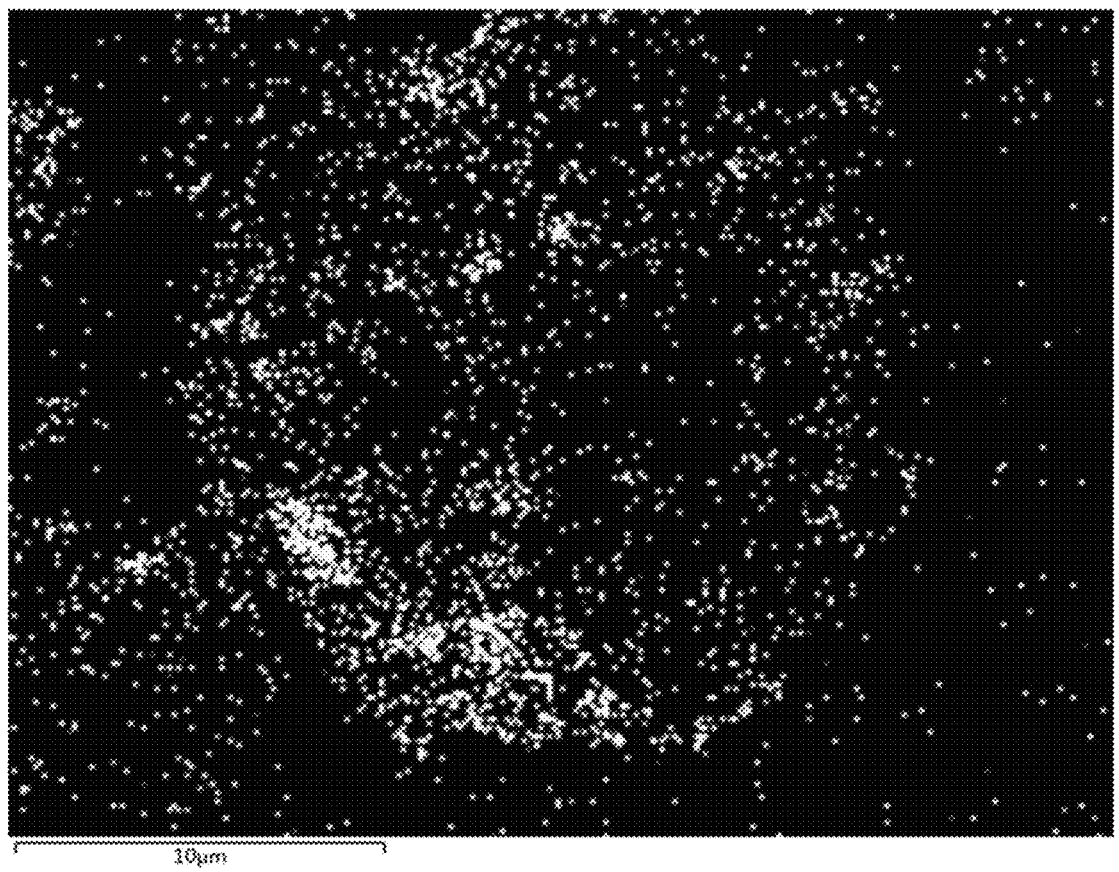

The SEM images in FIG. 1 show the overall morphology of SiO/graphite composite particles. The EDS images of FIG. 2 show the distribution of carbon and silicon elements, indicating the composite particles include both graphite particles and SiO particles.

Figure 3:
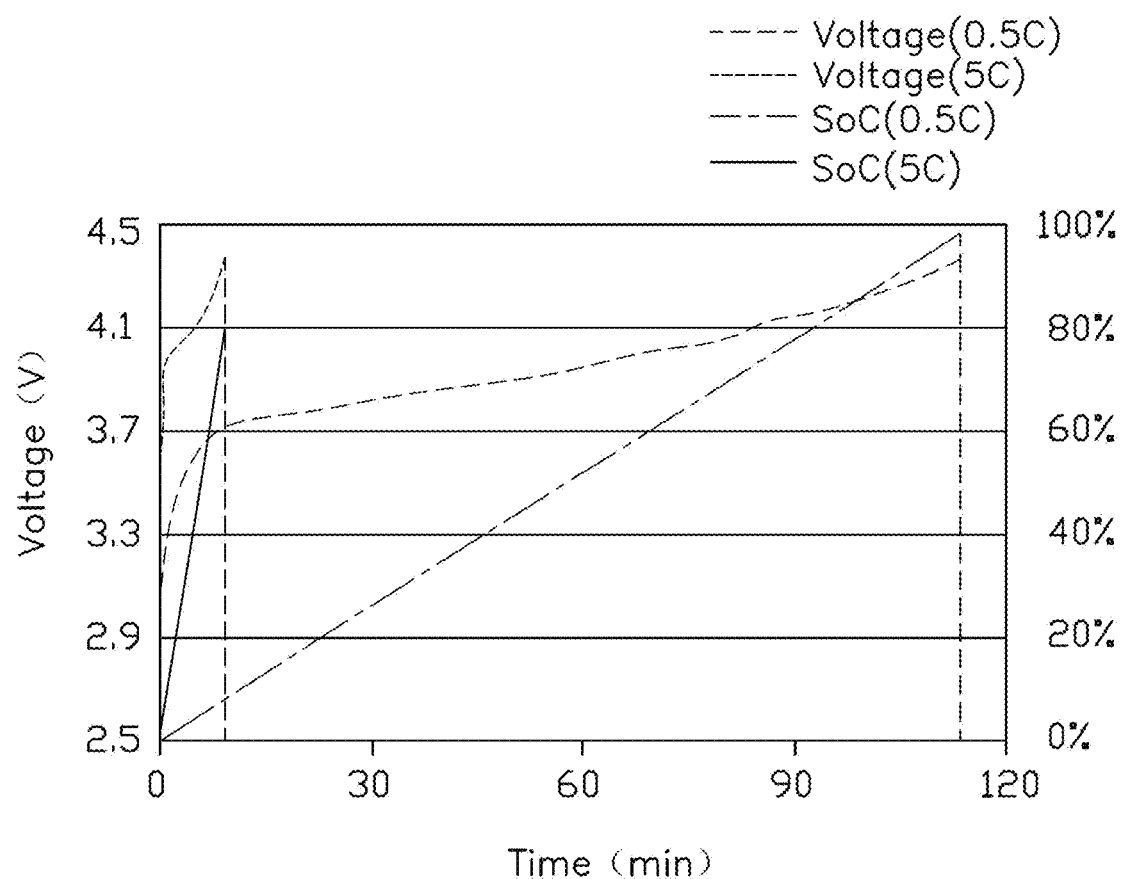
FIG. 3 shows charging efficiency of a cylindrical battery using the anode active material of the disclosure as described in Example 1.

The SiO/graphite composite was used as the anode active materials to construct cylindrical batteries. The 5C charging efficiency was defined as a ratio of the charging capacity at 5C constant current to the total rechargeable capacity (0.5C CC+CV charging capacity). FIG. 3 shows that the 5C charging efficiency of the cylindrical battery was about 80%. In other words, the cylindrical batteries can reach 80% of the state of full charge within 8 minutes. When the cylindrical batteries was constructed using a mixture of SiO particles and graphite particles of the same proportion but by physical mixing, the 5C charging efficiency was only 68~75%. The pomegranate structure of the SiO/graphite particles disclosed is the key factor to improving fast charging efficiency.

Example 2

2 g of bare SiO particles was dispersed in a mixed solvents of ethanol (750 mL) and water (75 mL) by ultrasound for 20 minutes. After that, 10 g MPS and 75 mL ammonia (catalyst) were added to initiate the reaction. During the reaction, the reactants were stirred ultrasonically for 2 minutes every 1~2 hours, and the reaction lasted for 4 hours. The reaction solution was then centrifuged to collect precipitate, and the precipitate is dried in vacuum to obtain SiO particles modified by MPS.

2 g SiO particles modified by MPS, 10 g NIPAAM monomers, 0.048 g AIBN were dispersed in 1 L ethanol and the solution was magnetically stirred for 8 hours. The reaction solution was then centrifuged and the precipitate was collected, and the precipitate is dried in vacuum to obtain SiO particles grafted with PNIPAAM.

Figure 4:
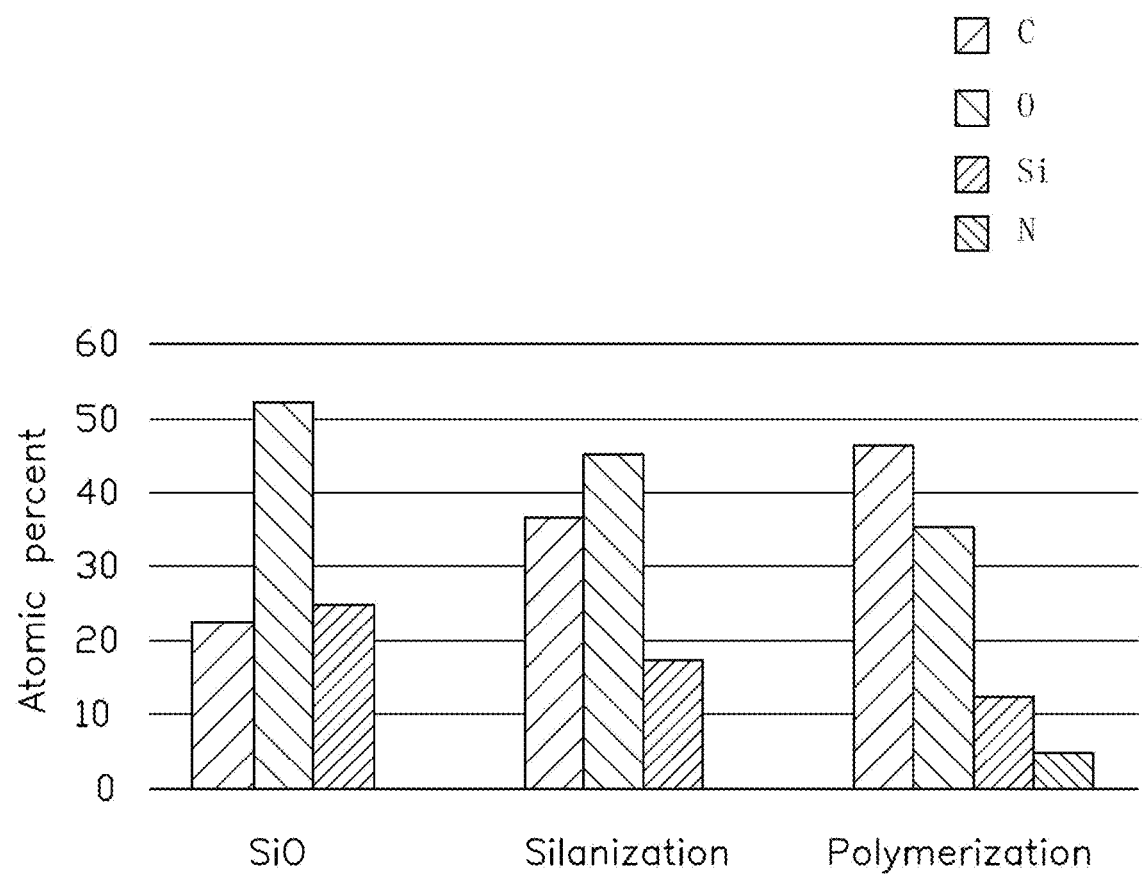
FIG. 4 shows XPS images of bare SiO, SiO silanized by MPS, and SiO grafted by PNIPAAM polymer as described in Example 2.
Figure 5:
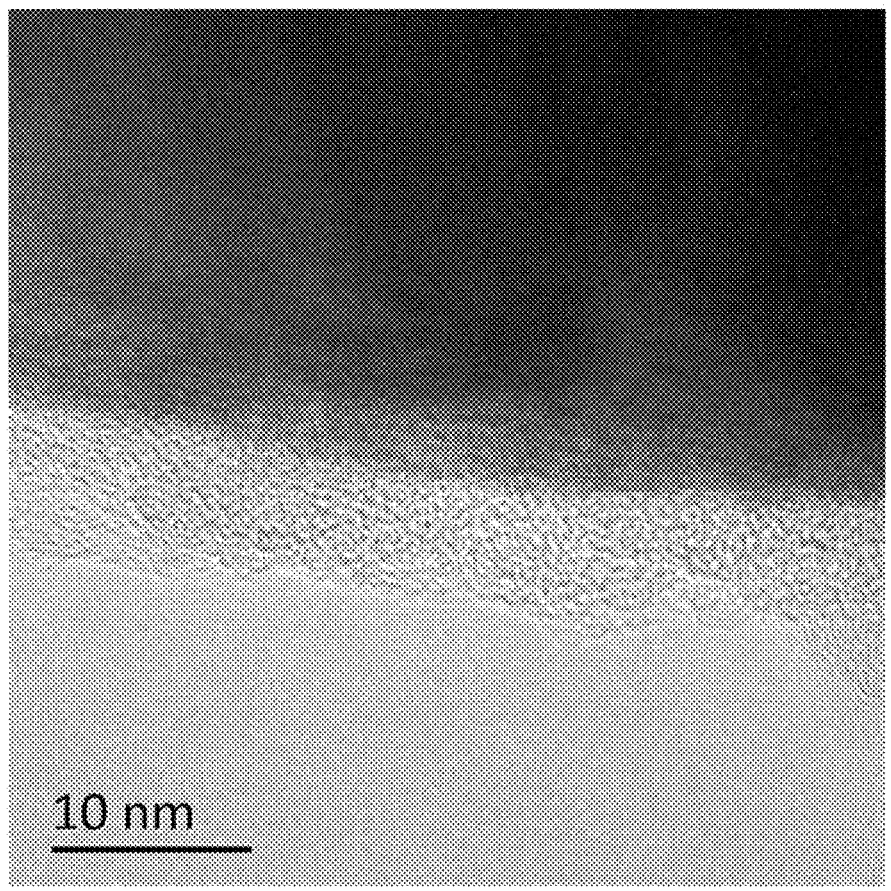
FIG. 5 shows TEM image of SiO grafted by PNIPAAM as described in Example 2.

The bare SiO particles, the SiO particles modified by MPS, and the SiO particles grafted with PNIPAAM were tested by X-ray photoelectron spectroscopy (XPS). FIG. 4 shows C content increased from 22.7% to 36.8% after modifying the surface of SiO particles by MPS, and further increased to 46.6% after grafting polymers to the surface of SiO particles. Meanwhile, Si and O contents decreased after modifying the surface of SiO particles by MPS, and further decreased after grafting polymers to the surface of SiO particles. N signal appears after grafting polymers to the surface of SiO particles, attributed to the presence of PNIPAAM, indicating that the polymers have been successfully grafted to the surface of SiO particles. FIG. 5 shows a TEM image of a SiO particle grafted with PNIPAAM. The thickness of the PNIPAAM is about 8 nm. Then, the SiO particles grafted with PNIPAAM are used to prepare the composite particles with the pomegranate structure using the same method as described in EXAMPLE 1.

Figure 6:
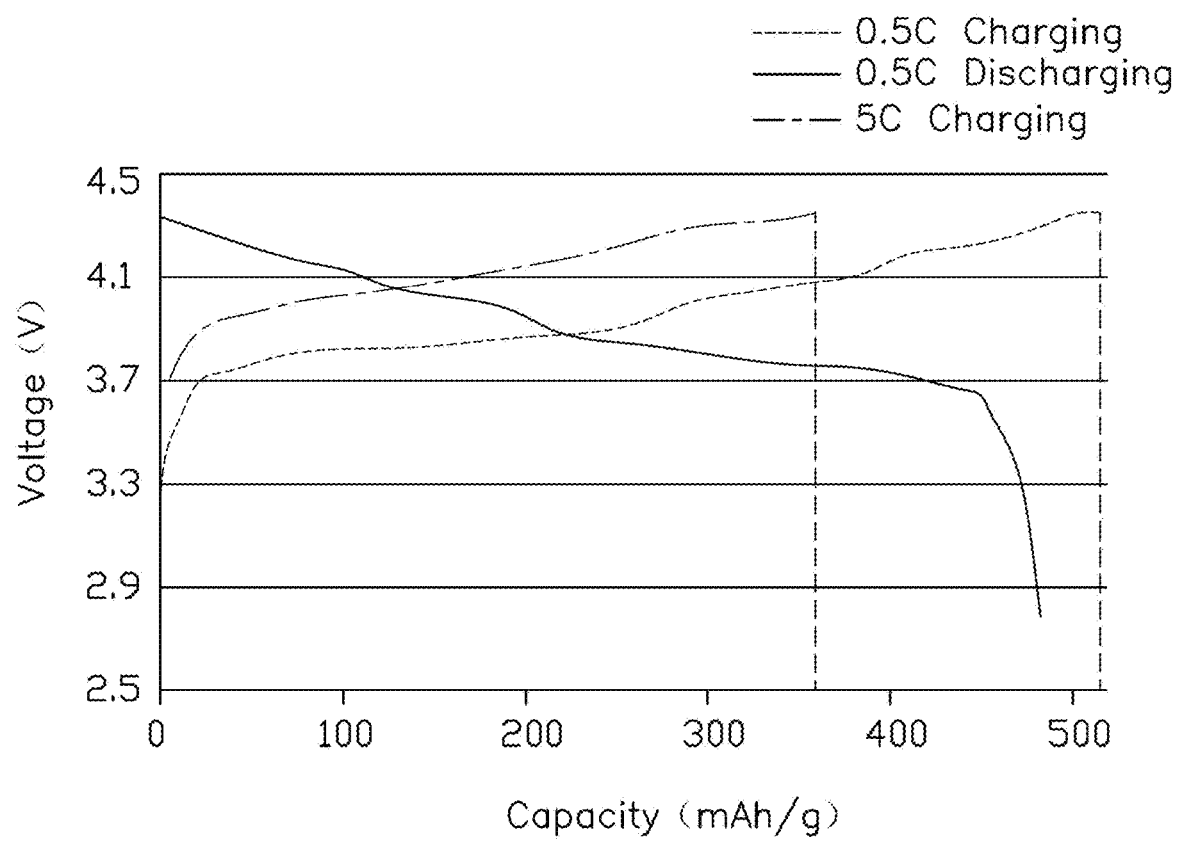
FIG. 6 shows charging efficiency of a battery using the anode active material of the disclosure as described in Example 2.
Figure 7:
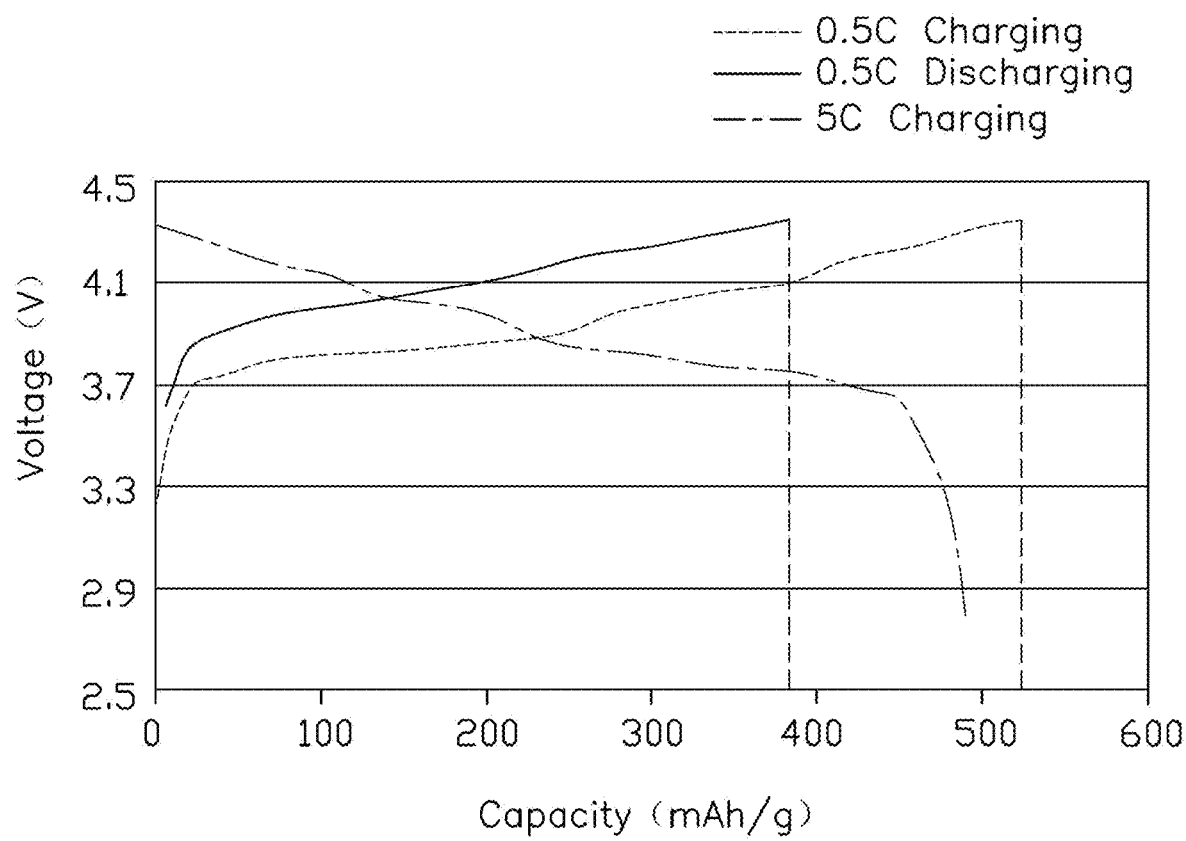
FIG. 7 shows charging efficiency of a battery using the anode active material of the disclosure as described in Example 2.

The polymer grafted SiO particles was used to prepare SiO/graphite composite particles with the method as described in Example 1. The composite was used to construct pouch batteries. FIG. 6 and FIG. 7 show that the 5C charging efficiency of the pouch batteries prepared by the method of EXAMPLE 1 and 2, respectively. The 5C charging efficiency of the pouch batteries using the anode active materials prepared in Example 1 is only at 67%. As a contrast, the 5C charging efficiency of the pouch batteries using the anode active materials prepared in Example 2 is 75%. Thus, the use of the SiO particles with polymer shells significantly improve the fast charging efficiency.

Example 3

100 g of SiO particles grafted with PNIAAM (with an average diameter of 1 μm) prepared according to EXAMPLE 2, 100 g sucrose, 1800 g graphite (with an average diameter of 5 μm), 3 g SDBS, 2000 g SWCNT aqueous solution (w/w=0.2% w/w, containing 0.4% PVP) were added to 7 kg water to obtain a suspension, and the suspension was mechanically stirred. The suspension was spray dried at temperature of 155~170° C., and then calcinated in argon atmosphere at a temperature of 800~850° C. for 2~4 hours, to obtain the anode active material of the pomegranate structure. A particle of the final anode active material has an average diameter of 17.5 μm.

Figure 8A:
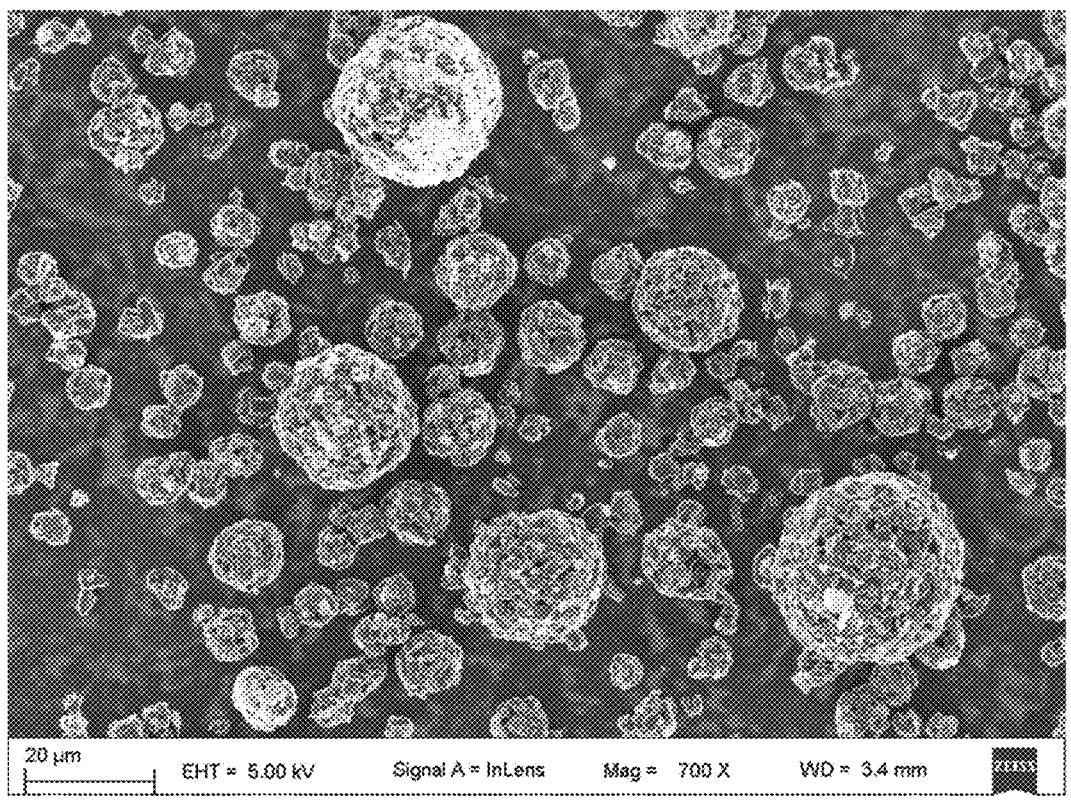
FIGS. 8A to 8C are SEM images showing different magnifications on the anode active material of the disclosure as described in Example 3. The magnifications in FIG. 8A to 8C are 700×, 2500×, and 20000×, subsequently.
Figure 8B:
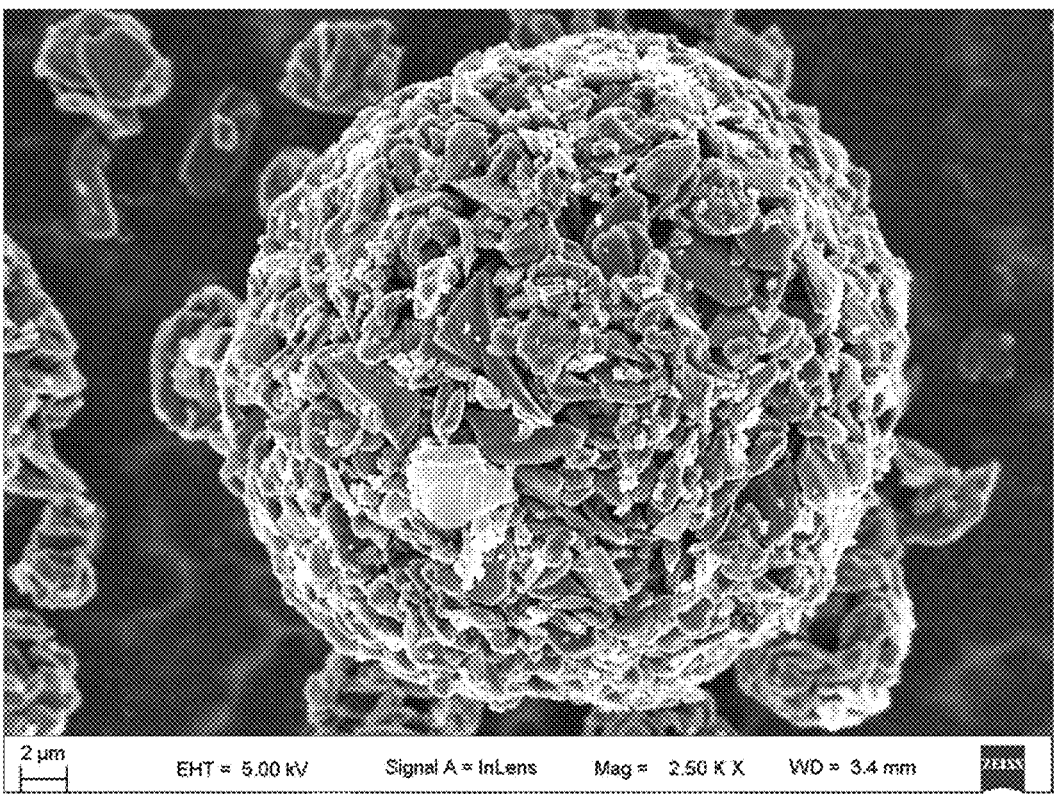
Figure 8C:
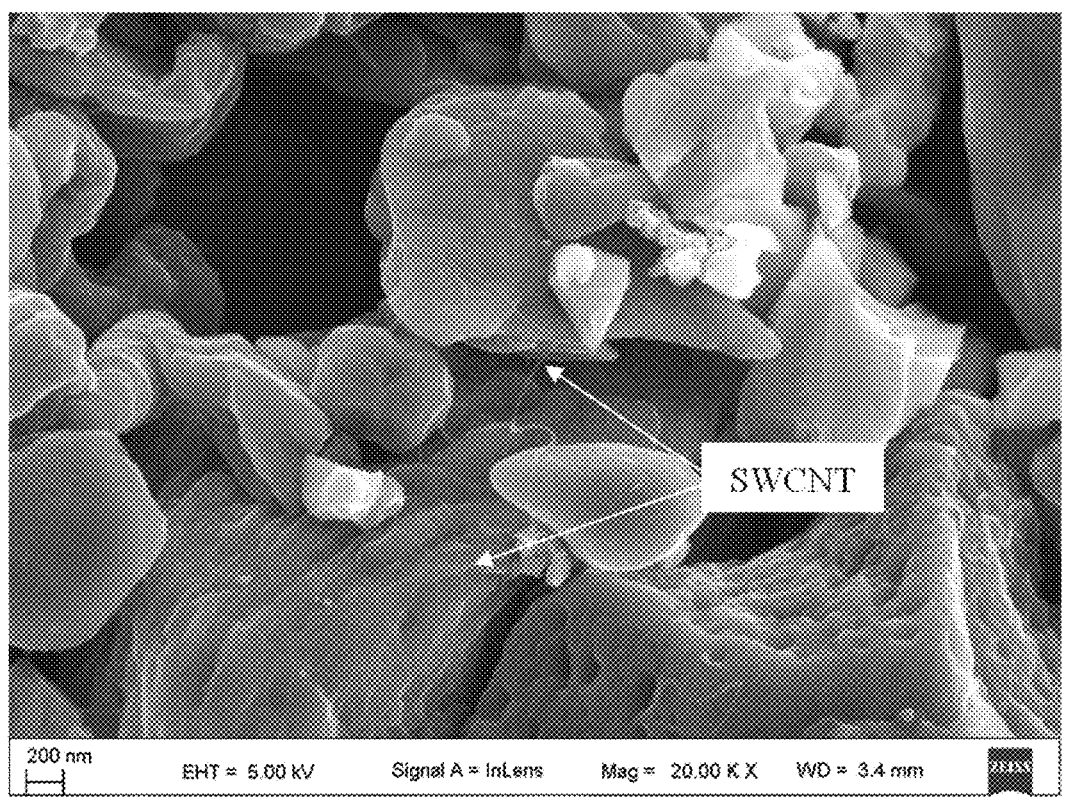
Figure 9A:
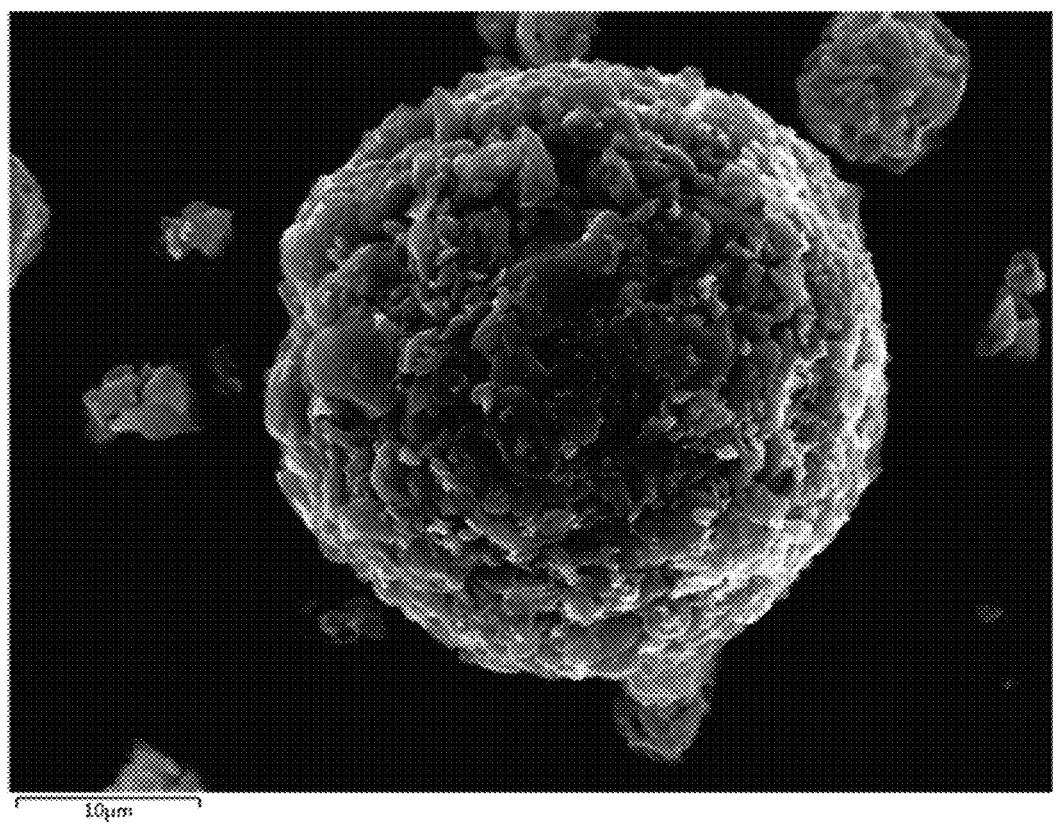
FIGS. 9A to 9D are SEM and EDS images of anode active material as described in Example 3.
Figure 9B:
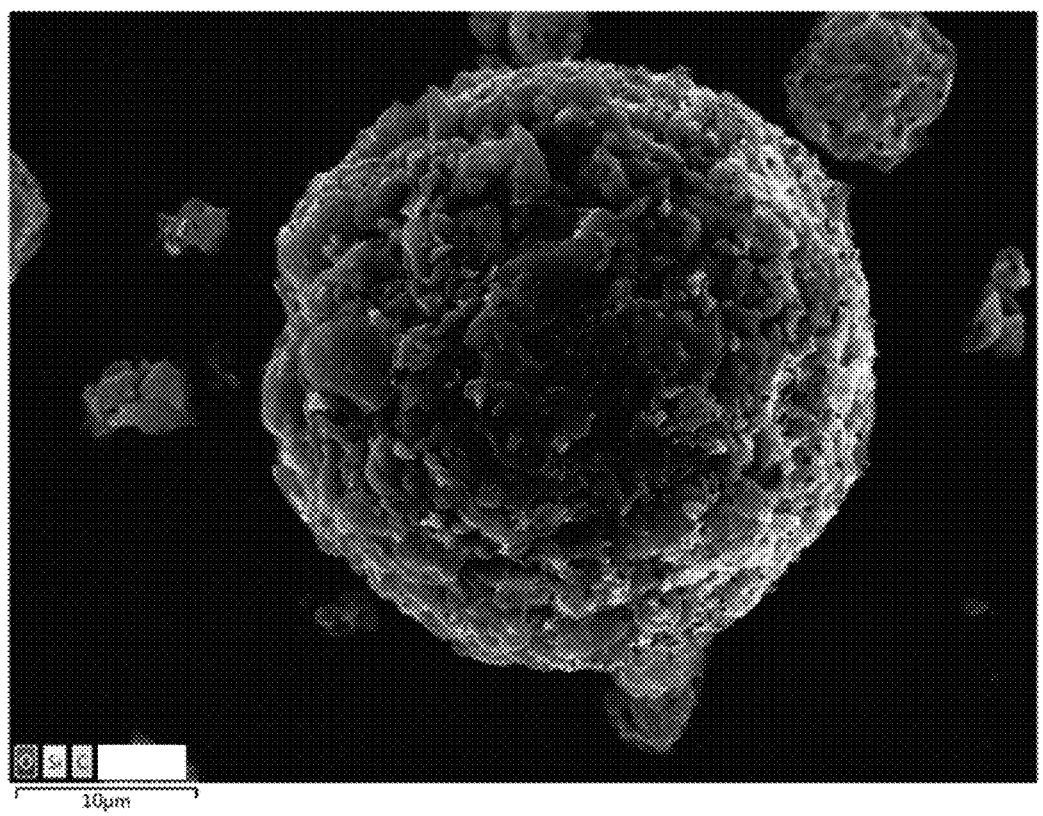
Figure 9C:
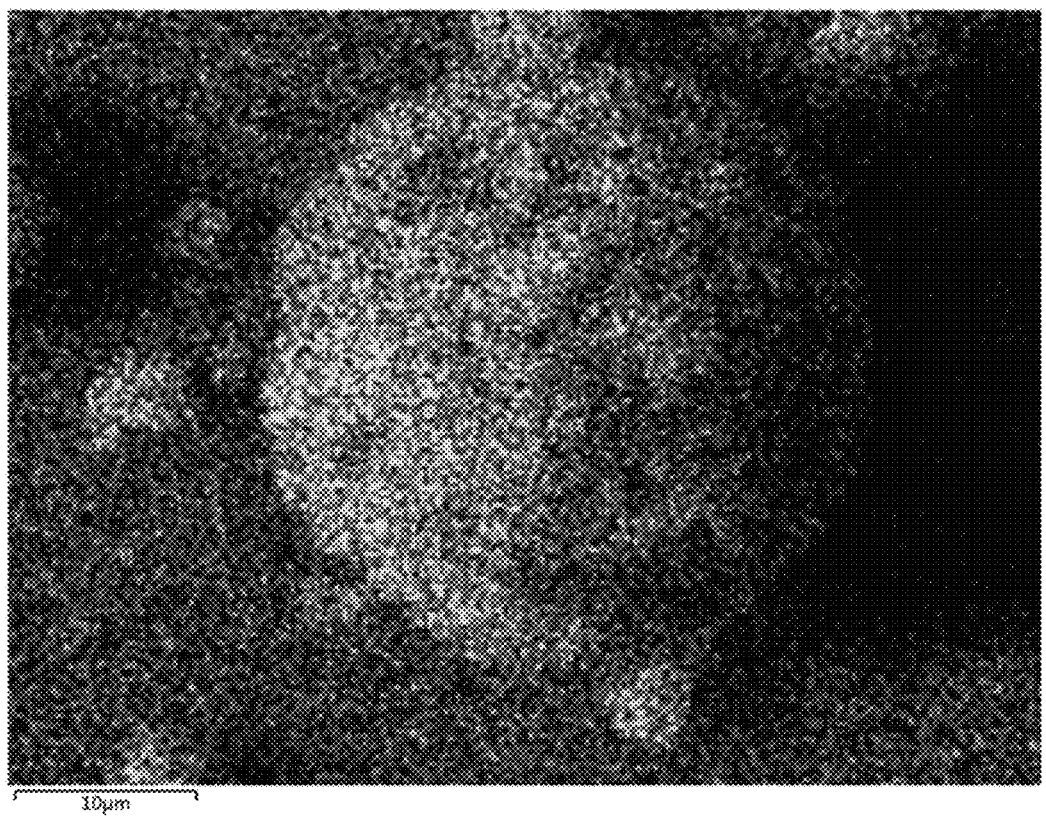
Figure 9D:
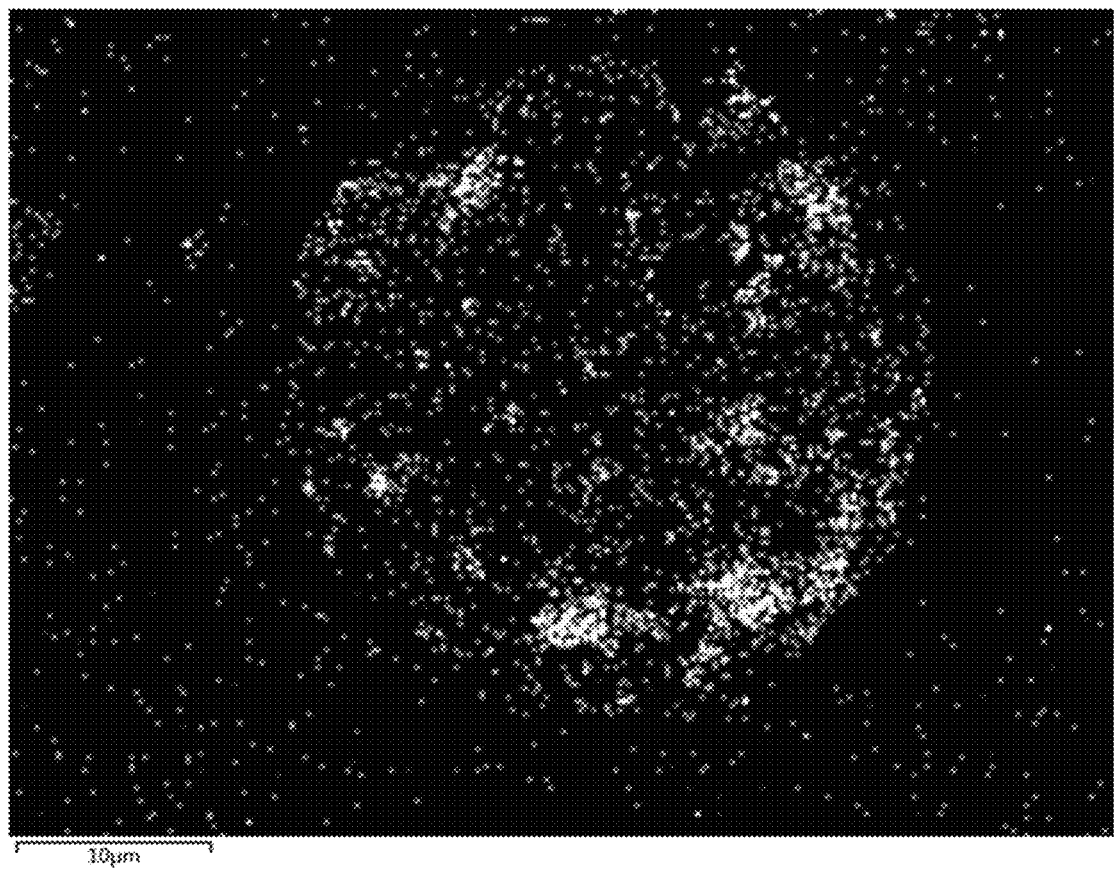

FIG. 8 and FIG. 9 show SEM images of the composite particles of SiO particles and graphite particles with an SWCNT network formed.

It is understood, even though information and advantages of the embodiments have been set forth in the foregoing description, together with details of the structures and functions of the embodiments, the disclosure is illustrative only. Changes may be made in detail, especially in matters of shape, size, and arrangement of parts within the principles of the embodiments to the full extent indicated by the plain meaning of the terms in which the appended claims are expressed.

What is claimed is:

1. A method for preparing an anode active material for a lithium-ion battery, comprising:
    forming a suspension by mixing and dissolving silicon monoxide particles, graphite particles, a binder, and a surfactant in a solvent;
    spray drying and calcining the suspension to produce the anode active material resembling a pomegranate structure, wherein the graphite particles and the silicon monoxide particles are mixed together to form spherical silicon monoxide-graphite composite particles, the binder and the surfactant become amorphous carbon after calcinations, the amorphous carbon forms a carbon coating layer on the surface of the silicon monoxide-graphite composite particles;
    wherein each of the silicon monoxide particles has a core-shell structure, which comprises a silicon monoxide particle core and a carbon coating shell formed on the surface of the silicon monoxide particle core, each of the silicon monoxide particles is prepared by modifying a surface of the silicon monoxide particle core by coupling agent and grafting polymers on the surface of the silicon monoxide particle core.

2. The method as claimed in claim 1, wherein the binder is a hydrophilic organic compound, and the surfactant is a long chain organic compound.

3. The method as claimed in claim 2, wherein the binder comprises as least one of monosaccharide, oligosaccharide, and polysaccharide, the surfactant comprises at least one of sodium lauryl sulfate, polyethylene glycol, polyethylene glycol-polypropylene oxide block copolymer, and sodium dodecyl benzene sulfonate.

4. The method as claimed in claim 1, wherein carbon nanotubes are further added to the suspension.

* * * * *